US010334213B2

United States Patent
Otsubo et al.

(10) Patent No.: US 10,334,213 B2
(45) Date of Patent: Jun. 25, 2019

(54) SCANNING IMAGE DISPLAY DEVICE

(71) Applicant: Hitachi-LG Data Storage, Inc., Tokyo (JP)

(72) Inventors: Ayano Otsubo, Tokyo (JP); Takanori Aono, Tokyo (JP); Hiroshi Ogasawara, Tokyo (JP); Tatsuya Yamasaki, Tokyo (JP); Kenji Watabe, Ibaraki (JP)

(73) Assignee: Hitachi-LG Data Storage, Inc., Tokyo (JP)

( * ) Notice: Subject to any disclaimer, the term of this patent is extended or adjusted under 35 U.S.C. 154(b) by 19 days.

(21) Appl. No.: 15/371,425

(22) Filed: Dec. 7, 2016

(65) Prior Publication Data
US 2017/0180688 A1   Jun. 22, 2017

(30) Foreign Application Priority Data
Dec. 21, 2015  (JP) ................. 2015-248634

(51) Int. Cl.
*G02B 26/08* (2006.01)
*G02B 27/00* (2006.01)
(Continued)

(52) U.S. Cl.
CPC ....... *H04N 9/3135* (2013.01); *G02B 26/0833* (2013.01); *G02B 26/105* (2013.01);
(Continued)

(58) Field of Classification Search
CPC .. H04N 9/3135; H04N 9/3161; H04N 9/3155; H04N 9/3164; H04N 9/3179;
(Continued)

(56) References Cited

U.S. PATENT DOCUMENTS

2004/0212861 A1  10/2004  Gagne et al.
2006/0139713 A1   6/2006  Yee et al.
(Continued)

FOREIGN PATENT DOCUMENTS

CN    1788271 A    6/2006
CN    1794038 A    6/2006
(Continued)

OTHER PUBLICATIONS

MachineTranslationofWO2006115355A1.*
(Continued)

*Primary Examiner* — Steven Whitesell Gordon
*Assistant Examiner* — Jerry L Brooks
(74) *Attorney, Agent, or Firm* — Mattingly & Malur, PC

(57) ABSTRACT

A scanning image display device is provided that can display high-quality images even with variation in environmental conditions at a place where the device is installed. The scanning image display device includes: a laser light source that emits laser light based on image information; a scanning mirror that scans the laser light emitted from the laser light source to project an image on a projection plane; a housing that holds the laser light source and the scanning mirror; and a container formed of a base and an outer cover that accommodates the housing and is internally sealed, wherein the outer cover has a thin-wall portion that is elastically deformed with variation in pressure within the container.

16 Claims, 7 Drawing Sheets

(51) Int. Cl.
*H04N 9/31* (2006.01)
*G02B 26/10* (2006.01)

(52) U.S. Cl.
CPC ..... *G02B 27/0006* (2013.01); *G02B 27/0031* (2013.01); *H04N 9/3129* (2013.01); *H04N 9/3141* (2013.01); *H04N 9/3144* (2013.01); *H04N 9/3161* (2013.01); *H04N 9/3155* (2013.01); *H04N 9/3164* (2013.01); *H04N 9/3179* (2013.01)

(58) Field of Classification Search
CPC .............. G02B 26/0833; G02B 26/105; G02B 27/0006; G02B 27/0031
USPC ........................................................ 353/119
See application file for complete search history.

(56) References Cited

U.S. PATENT DOCUMENTS

| | | | |
|---|---|---|---|
| 2010/0231870 A1* | 9/2010 | Chikaoka | G02B 26/085 353/85 |
| 2011/0228033 A1 | 9/2011 | Adachi et al. | |
| 2013/0242275 A1 | 9/2013 | Kilcher et al. | |
| 2014/0293391 A1 | 10/2014 | Hashimoto et al. | |
| 2014/0293430 A1 | 10/2014 | Takahashi | |

FOREIGN PATENT DOCUMENTS

| | | | |
|---|---|---|---|
| EP | 2 367 246 A2 | 9/2011 | |
| JP | 2005-310979 A | 11/2005 | |
| JP | 2010-256384 A | 11/2010 | |
| JP | 2014-194504 A | 10/2014 | |
| JP | 2014-197127 A | 10/2014 | |
| WO | WO2006115355 A1 * | 11/2006 | ............ G03B 21/10 |
| WO | 2011/134513 A1 | 11/2011 | |

OTHER PUBLICATIONS

Chinese Office Action received in corresponding Chinese Application No. 201611123319.9 dated Nov. 19, 2018.

Japanese Office Action received in corresponding Japanese Application No. 2015-248634 dated Mar. 5, 2019.

* cited by examiner

SCANNING IMAGE DISPLAY DEVICE

REFERENCE TO RELATED APPLICATION

This application claims the benefit of priority to Japanese Patent Application No. 2015-248634 filed 21 Dec. 2015, the disclosures of all of which are hereby incorporated by reference in their entireties.

TECHNICAL FIELD

The present invention relates to a scanning image display device that scans laser light to display an image.

BACKGROUND ART

A scanning image display device is known that reflects laser light on a scanning mirror, which is cyclically turned, to display an image on a projection plane. A conventional scanning image display device has a problem that the deflection angle of the scanning mirror varies in accordance with variation in atmospheric pressure in an area where the scanning mirror is arranged, to cause a displayed image on the projection plane to be distorted. As a technique for solving such a problem, Japanese Patent Application Publication No. 2014-197127, for example, discloses setting a driving voltage for scanning laser light depending on atmospheric pressure in an area where a laser light scanning unit (or a scanning mirror) is arranged.

SUMMARY OF THE INVENTION

Problems to be Solved

In the technique disclosed in Japanese Patent Application Publication No. 2014-197127, the driving voltage for scanning is newly set, after the atmospheric pressure has varied in the area where the laser light scanning unit is arranged, in accordance with the variation. Therefore, a time lag until variation in the atmospheric pressure is reflected to the driving voltage for scanning, and the actual variation in the atmospheric pressure in the said area likely cause, in combination, a scanning angle of the laser light to be unstable, leading to a distorted image.

Then, the present invention is intended to provide a scanning image display device that can display high-quality images even with variation in environmental conditions at a place where the device is installed.

Solution to Problems

In order to solve the above-described problems, the scanning image display device according to the present invention includes: a laser light source; a scanning mirror; a housing that holds the laser light source and the scanning mirror; and a container that accommodates the housing and is internally sealed, wherein the container has a first deformable portion that is elastically deformed with variation in pressure within the container.

In addition, the scanning image display device according to the present invention includes: a laser light source; a scanning mirror; a housing that holds the laser light source and the scanning mirror; and a container that accommodates the housing and is internally sealed, wherein the density of gas sealed in the container is less than that of the air in the standard condition, or the viscosity of the gas sealed in the container is less than that of the air in the standard condition.

Advantageous Effects of the Invention

The present invention provides a scanning image display device that can display high-quality images even with variation in environmental conditions at a place where the device is installed.

EMBODIMENTS OF THE INVENTION

First Embodiment

<Configuration of Scanning Image Display Device>

Figure 1:
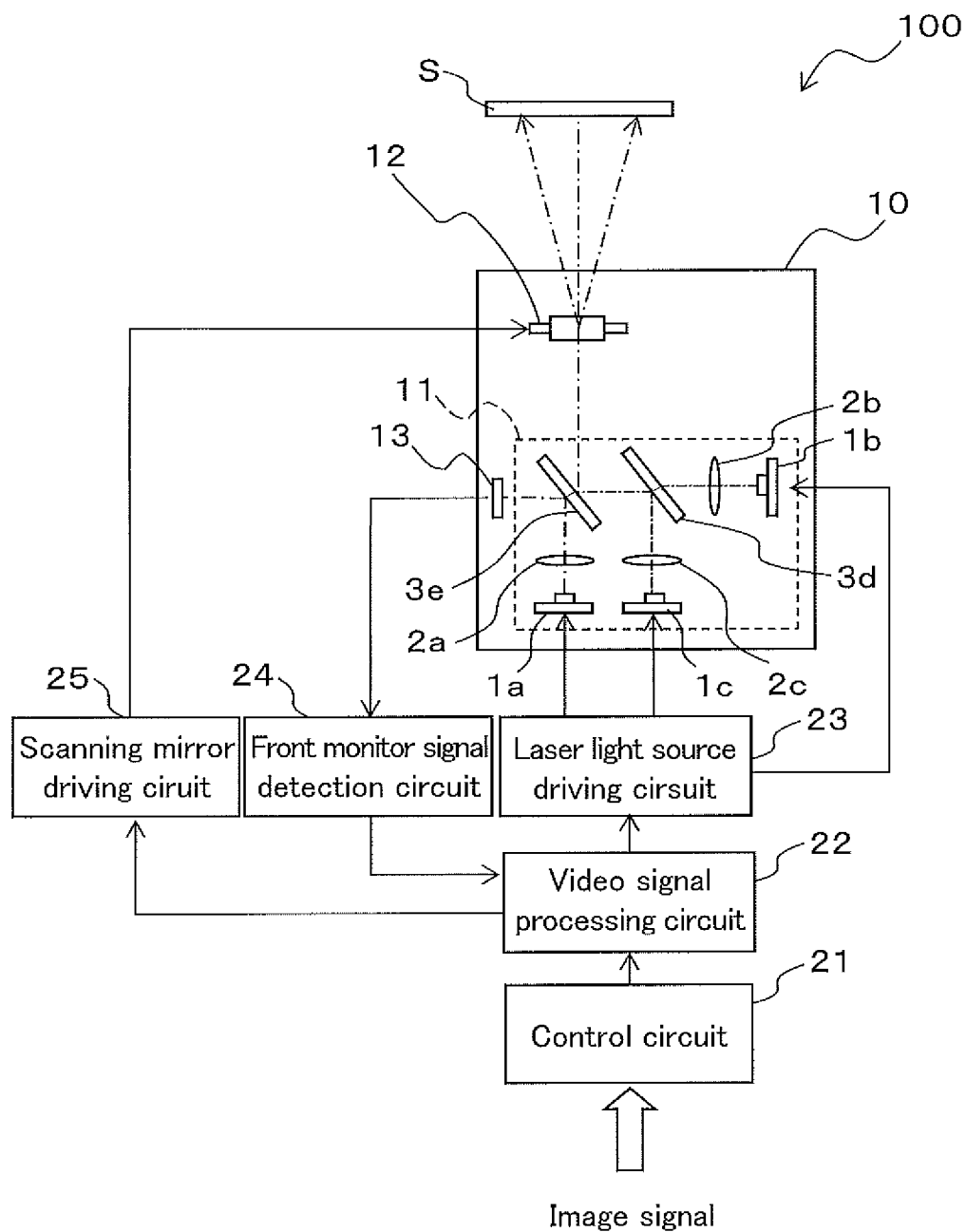
FIG. 1 is a configuration diagram of a scanning image display device according to a first embodiment of the present invention.

FIG. 1 is a configuration diagram of a scanning image display device 100 according to the first embodiment.

The scanning image display device 100 is a device for scanning laser light emitted from laser light sources 1a, 1b, 1c to project (display) an image on a screen S as a projection plane. The scanning image display device 100 is used as a head-up display for displaying an image on a windshield of a vehicle, and also a projector or the like.

As shown in FIG. 1, the scanning image display device 100 includes an optical module 10, a control circuit 21, a video signal processing circuit 22, a laser light source driving circuit 23, a front monitor signal detection circuit 24, and a scanning mirror driving circuit 25. The scanning image display device 100 includes, in addition to the above-described components, such as a housing 31 (see FIG. 2) that holds parts of the optical module 10, a base 32 that accommodates the housing 31, and an outer cover 33 (see FIG. 2).

The optical module 10 in FIG. 1 includes a laser light source module 11, a scanning mirror 12, and a front monitor 13. The laser light source module 11 is capable of coupling laser light of three primary colors of red (R), green (G), and blue (B) as uniaxial laser light. The laser light source module 11 includes the laser light sources 1a, 1b, 1c, collimator lenses 2a, 2b, 2c, and beam couplers 3d, 3e.

The laser light source 1a is a light source that emits a red laser beam. The laser light source 1b is a light source that emits a green laser beam. The laser light source 1c is a light source that emits a blue laser beam. The collimator lens 2a is a lens for correcting aberrations of laser light which comes incident from the laser light source 1a so as to be parallel light, and is arranged on the optical axis of the laser light source 1a. Other collimator lenses 2b, 2c are the same as with the collimator lens 2a.

The beam coupler 3d is a coupler that couples green laser light (laser beam), which comes incident via the collimator lens 2b, and blue laser light (laser beam), which comes incident via another collimator lens 2c, to produce uniaxial laser light.

Another beam coupler 3e is a coupler that couples the laser light which comes incident from the said beam coupler 3d, and red laser light which comes incident via the collimator lens 2a, as uniaxial laser light.

The scanning mirror 12 is a mirror that scans the laser light emitted from the laser light sources 1a, 1b, 1c (i.e., the laser light after the coupling as described above), to project an image on the screen S (projection plane). A mirror surface of the scanning mirror 12 is repeatedly turned in a cyclic manner in two dimensions (i.e., biaxially) by a driving signal inputted by the scanning mirror driving circuit 25, to reflect the laser light which comes incident from the beam coupler 3e. This allows the laser light to be scanned on the screen S in two-dimensions in the horizontal and vertical directions, to display an image. Note that the scanning mirror 12 may employ, for example, a biaxially driven mirror manufactured by using the MEMS (Micro Electro Mechanical Systems). The scanning mirror 12 may be driven by a driving method such as piezoelectric driving, electrostatic driving, and electromagnetic driving.

The front monitor 13 detects the laser light after the coupling by the beam coupler 3e, to output a detection signal to the front monitor signal detection circuit 24 to be described later.

The control circuit 21 captures an image signal (image information) which is externally inputted, and outputs information on the captured image to the video signal processing circuit 22.

The video signal processing circuit 22 executes various processes on the image signal inputted by the control circuit 21, and then separates the image signal after the processing into the three primary color signals of R/G/B, to output the three primary color signals after the separation to the laser light source driving circuit 23. In addition, the video signal processing circuit 22 extracts a horizontal synchronizing signal (HSYNC) and a vertical synchronizing signal (VSYNC) from an image signal which is inputted by the control circuit 21, to output these signals to the scanning mirror drive circuit 25.

The laser light source driving circuit 23 generates driving currents based on the luminance values, for the respective three primary color signals inputted by the video signal processing circuit 22, to drive the laser light sources 1a, 1b, 1c with the driving currents, respectively. For example, the laser light source driving circuit 23 drives the red laser light source 1a with a drive current based on the luminance value of a signal corresponding to red (the same applies to green and blue). This allows the laser light sources 1a, 1b, 1c to emit laser light having intensity based on the luminance values of R/G/B, in accordance with the predetermined display timing based on the image signal.

The scanning mirror driving circuit 25 generates a driving signal, in accordance with the horizontal and vertical synchronizing signals inputted by the video signal processing circuit 22, for repeatedly turning the scanning mirror 12 in two-dimensions, to output the generated driving signal to the scanning mirror 12.

The front monitor signal detection circuit 24 detects, based on the detection signal from the front monitor 13, output levels of the laser light of R/G/B emitted from the laser light sources 1a, 1b, 1c. The output levels detected by the front monitor signal detection circuit 24 are inputted to the video signal processing circuit 22. The driving currents of the laser light sources 1a, 1b, 1c are regulated by the laser light source driving circuit 23 so as to have the predetermined output levels.

Figure 2:
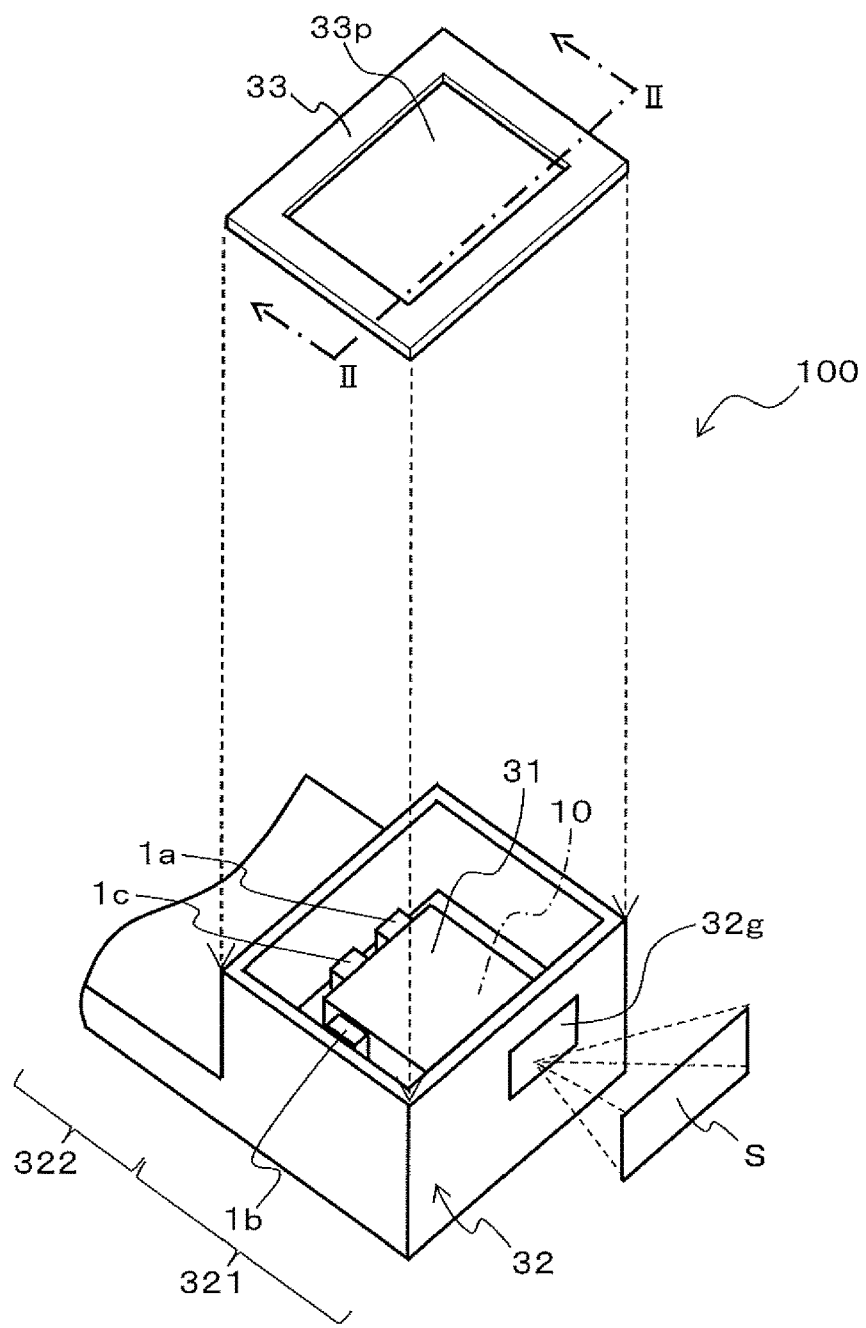
FIG. 2 is an exploded perspective view of an optical module, a housing, a base, and an outer cover, which are included in the scanning image display device.

FIG. 2 is an exploded perspective view of the optical module 10, the housing 31, the base 32, and the outer cover 33 included in the scanning image display device 100. Note that the x-axis, y-axis, and z-axis are defined as shown in FIG. 2.

The scanning image display device 100 includes, in addition to the optical module 10 and the like (see FIG. 1), the housing 31, the base 32, and the outer cover 33, which are shown in FIG. 2, and further a protective cover 34 (see FIG. 3), a heat sink 35 (see FIG. 3), and a temperature adjusting element 36 (see FIG. 4), which are to be described later.

The housing 31 in FIG. 2 is a housing that accommodates respective components of the optical module 10 such as the laser light sources 1a, 1b, 1c and the scanning mirror 12 (see FIG. 1). Magnesium alloy having high rigidity and high heat conductivity may be used, for example, as a material for the housing 31. Note that the laser light sources 1a, 1b, 1c are arranged on side walls of the housing 31 so as to emit laser light toward the inside of the housing 31. The collimator lenses 2a, 2b, 2c, the beam couplers 3d, 3e, the scanning mirror 12, and the front monitor 13, which are shown in FIG. 1, are also arranged within the housing 31 at predetermined positions, respectively.

The base 32 includes a box-like portion 321 (concave portion having an open top) that accommodates the housing 31 together with the outer cover 33, a plate-like portion 322 that extends from the bottom wall of the box-like portion 321 in the y-axis direction, and a sealing glass 32g that is arranged on the box-like portion 321. Note that part of the plate-like portion 322 is not shown in FIG. 2.

The box-like portion 321 is arranged such as with the housing 31 that holds the optical module 10 (see FIG. 1). The plate-like portion 322 is arranged with a substrate (not shown) on which the respective circuits described above are mounted. The sealing glass 32g is glass for transmitting laser light reflected by the scanning mirror 12 (see FIG. 1) toward the screen S. The sealing glass 32g seals in the box-like portion 321 so that humid ambient air is inhibited from entering.

The outer cover 33 accommodates the housing 31 together with the base 32, and has a plate shape. The outer cover 33 is arranged so as to close the opening of the box-like portion 321 included in the base 32. Note that a thin-walled portion 33p in FIG. 3 will be described later.

The "container" for accommodating the housing 31 is configured to include the base 32 and the outer cover 33. In a state where the outer cover 33 is arranged, the said "container" is internally sealed. For example, an annular sealing groove (not shown) which recesses downward in a vertical cross-sectional view may be arranged on the upper surface of the box-like portion 321, and then an O-ring (not shown) may be arranged in the sealing groove to internally seal the "container," even though they are not illustrated. Alternatively, a resin may be used to seal a gap between the base 32 and the outer cover 33.

In such a manner, the "container" is internally sealed to inhibit humid air from entering into the "container," so as to prevent dew condensation such as on the laser light sources 1a, 1b, 1c. Then, relatively dry air is sealed in the "container."

Note that the vicinity of wiring (not shown) that electrically connects the circuits mounted on the substrate (not shown) on the plate-like portion 322 with the laser light sources 1a, 1b, 1c is sealed with resin.

The base 32 and the outer cover 33 are formed of, for example, Al (aluminum) which has high thermal conductivity. This allows heat to be easily radiated outward from the laser light sources 1a, 1b, 1c and the circuits. Note that any material can be used for the base 32 and the outer cover 33 as long as it has high thermal conductivity, and Cu (copper) may be used, for example.

Figure 3:
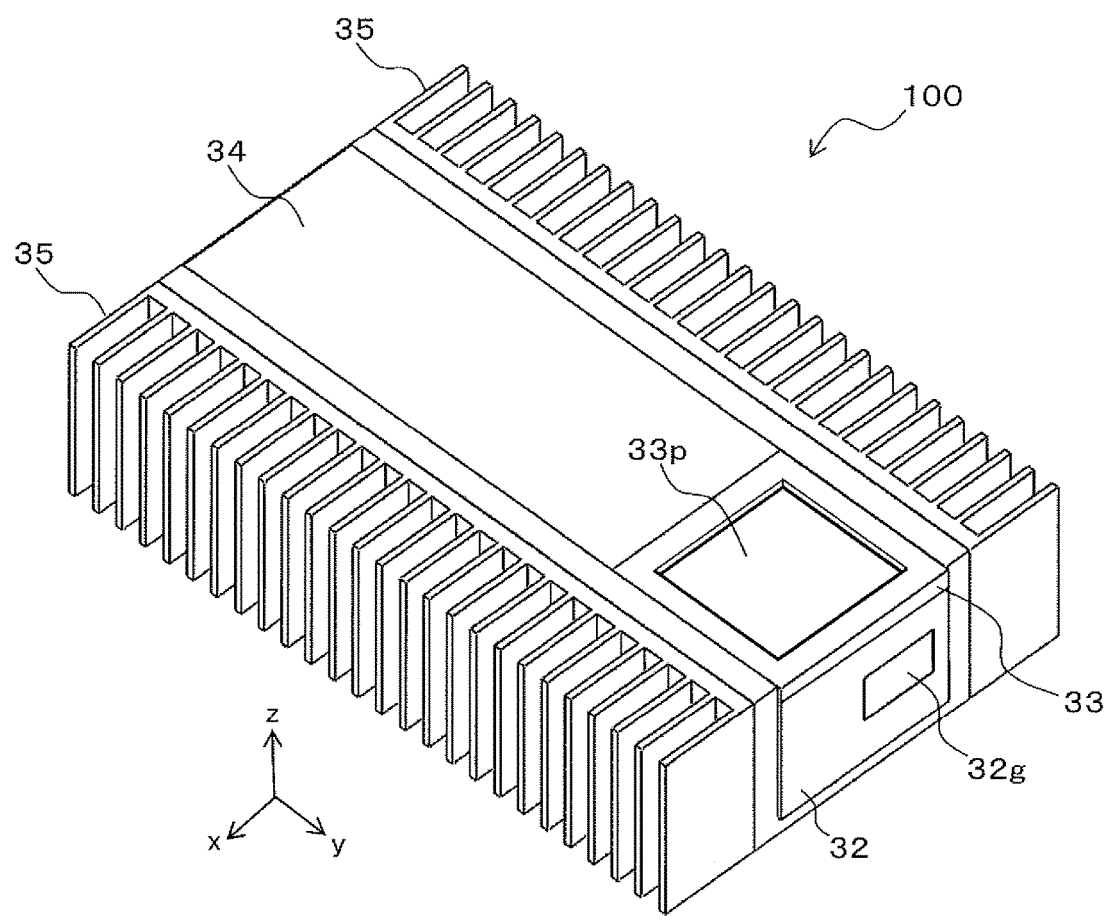
FIG. 3 is a perspective view of the scanning image display device.

FIG. 3 is a perspective view of the scanning image display device 100.

The protective cover 34 in FIG. 3 is a cover that protects the circuits. As described above, the substrate mounted with the respective circuits (not shown) is arranged on the plate-like portion 322 (see FIG. 2), and the protective cover 34 is arranged so as to cover the substrate. Note that, for the protective cover 34, SPCC (cold-rolled carbon steel at a commercial quality level) such as a zinc steel plate and an iron plate may be used, or Al (aluminum) may be used because of its high thermal conductivity.

The heat sink 35 is used for releasing heat from the circuits described above and heat from the laser light sources 1a, 1b, 1c accommodated in the box-like portion 321 (see FIG. 2) to the outside, and has fins. In the example shown in FIG. 3, the heat sinks 35 are arranged so as to hold the base 32, the outer cover 33, and the protective cover 34 from both sides in the x-axis direction.

Figure 4:
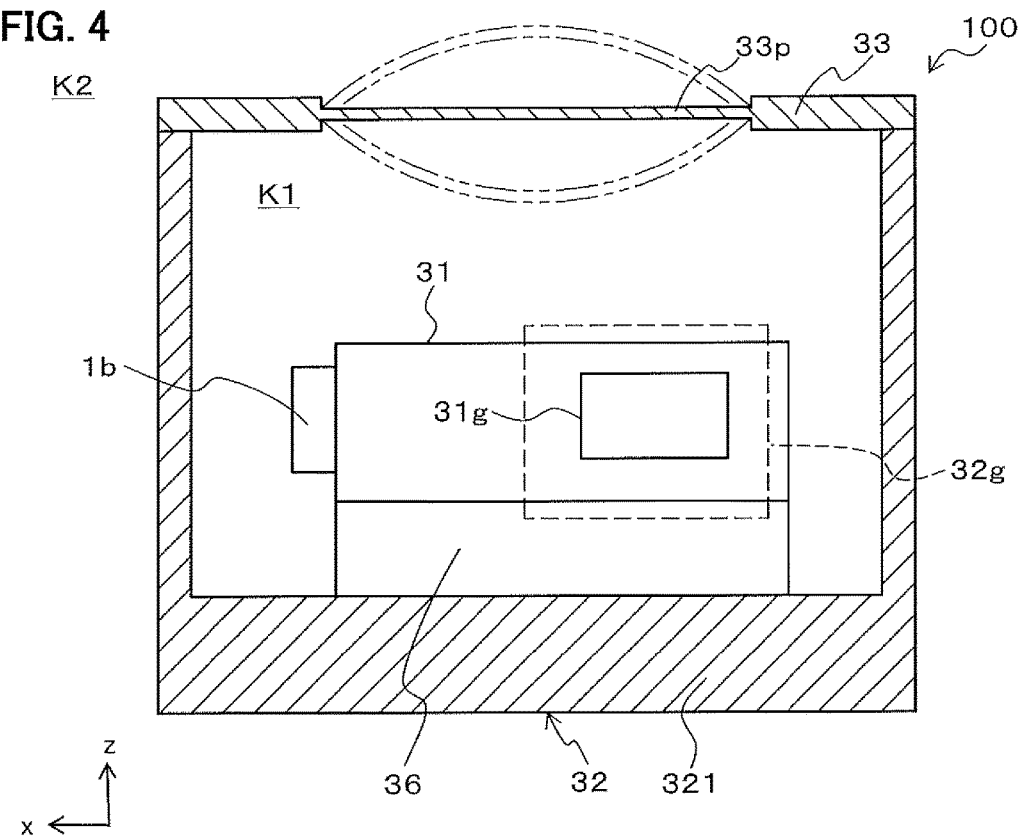
FIG. 4 is a cross-sectional view taken along an arrow line II-II in FIG. 2.

FIG. 4 is a cross-sectional view taken along an arrow line II-II in FIG. 2. Note that the heat sinks 35 (see FIG. 3) are not shown in FIG. 4. In addition, a rectangular broken line in FIG. 4 represents the sealing glass 32g (see FIG. 2) included in the base 32.

As shown in FIG. 4, the housing 31 includes glass 31g through which the laser light reflected by the scanning mirror 12 (see FIG. 1) is transmitted toward the screen S. That is, the light reflected by the scanning mirror 12 is adapted to pass through the glass 31g and the sealing glass 32g toward the screen S.

The temperature adjusting element 36 is an element that maintains the temperature of the laser light sources 1a, 1b, 1c within a predetermined guaranteed operating temperature range. As the temperature adjusting element 36, a Peltier element may be used that varies its temperature by the magnitude and direction of a current flowing therethrough. In the example shown in FIG. 4, the temperature adjusting element 36 is arranged on the bottom wall of the box-like portion 321, and then the housing 31 is set on the temperature adjusting device 36.

For example, in a case where the scanning image display device 100 is used as a head-up display to be mounted on a vehicle, ambient temperature (temperature of ambient air K2 in FIG. 4) may likely vary in a range from tens of degrees Celsius below zero to near hundred degrees Celsius, considering the use in a cold district or on a hot day. That is, the ambient temperature varies even to the extent that it significantly deviates from the guaranteed operating temperature range of the laser light sources 1a, 1b, 1c, and therefore the temperature adjusting device 36 is arranged to adjust the temperature of the laser light sources 1a, 1b, 1c.

As shown in FIG. 4, the outer cover 33 includes a thin-wall portion 33p (first deformable portion) whose wall thickness is thinner than the rest of the "container" inclusive of the outer cover 33. The thin-wall portion 33p elastically deforms in accordance with variation in pressure within the "container" to have a function of reducing the said variation in pressure.

Note that in the case of forming the outer cover 33 with Al (aluminum), the thickness of the thin-wall portion 33p preferably falls between 1 mm and 10 mm. Such a thickness will suitably allow the thin-wall portion 33p to elastically deform in accordance with variation in pressure of the air which is sealed in the "container" (hereinafter, referred to as sealed air K1: see FIG. 4).

For example, when the ambient temperature of the vehicle in which the scanning image display device 100 is mounted is relatively high, the heat is transfered through the outer cover 33 and the base 32 to make the temperature of the sealed air K1 higher than that at the time of being sealed (immediately after being sealed) in the "container." With the increasing pressure of the sealed air K1 in accordance with the temperature rise, the thin-wall portion 33p elastically deforms so as to expand outward (see upper two-dot chain lines in FIG. 4). That is, the "container" increases in volume to reduce the increasing pressure of the sealed air K1. As a result, the pressure of the sealed air K1 hardly varies as compared with that at the time of being sealed.

In contrast, for example, when the ambient temperature of the vehicle in which the scanning image display device 100 is mounted is relatively low, the temperature of the sealed air K1 is lower than that at the time of being sealed. With the pressure of the sealed air K1 starting to decrease in accordance with the decreasing temperature, the thin-wall portion 33p elastically deforms so as to sag inward (see lower two-dot chain lines in FIG. 4). That is, the "container" decreases in volume to reduce the decreasing pressure of the sealed air K1. As a result, the pressure of the sealed air K1 hardly varies as compared with that at the time of being sealed.

Note that the inside of the housing 31 is, even though it is not illustrated, in communication with the inside of the "container" at a number of positions. Then, the internal pressure of the housing 31 is substantially the same as the pressure of the sealed air K1. That is, even if the temperature of the ambient air K2 varies, the pressure hardly varies near the scanning mirror 12 (see FIG. 1) which is held in the housing 31.

<Advantageous Effects>

According to the present embodiment, even if the environmental conditions, such as the temperature of the ambient air K2, varies at a place where the device is installed, variation in pressure within the "container" is reduced to keep the pressure substantially constant. Accordingly, the air resistance to the scanning mirror 12 which is turned at a predetermined driving voltage (driving pattern) less likely varies, to reduce variation in the deflection angle of the scanning mirror 12. This allows for reducing distortion of images to be projected on the screen S (see FIG. 1) to display high-quality images.

Figure 10:
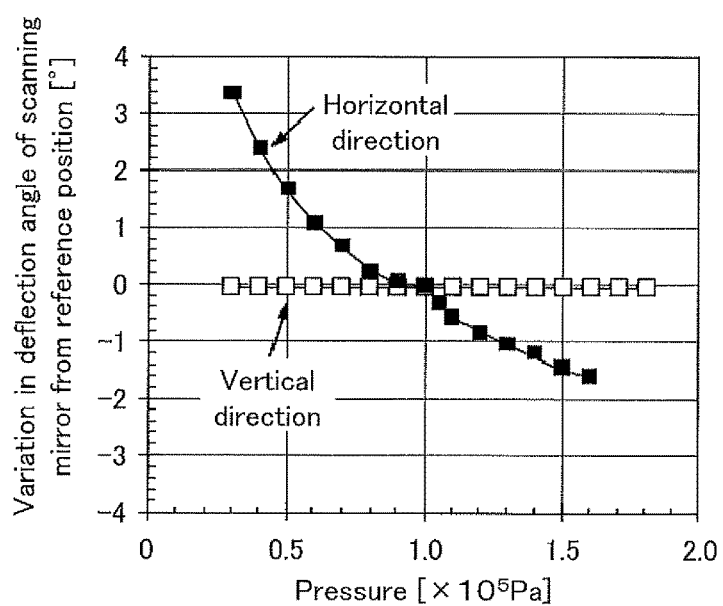
FIG. 10 is a chart showing the relationship, in a comparative example of the outer cover having no thin-wall portion, between the pressure of the air sealed in in the container and the variation in the deflection angle of the scanning mirror from the reference position.

FIG. 10 is a chart showing the relationship, in a comparative example of the outer cover having no thin-wall portion, between the pressure of the sealed air K1 in the container and the variation in the deflection angle of the scanning mirror 12 from the reference position. Note that the horizontal axis in FIG. 10 is the pressure of the sealed air K1 in the "container" in the comparative example. In addition, the vertical axis in FIG. 10 is the variation in the deflection angle of the scanning mirror 12 from the reference position, in the case where the scanning mirror 12 is turned at a predetermined driving voltage.

The scanning mirror 12 (see FIG. 1) is configured to be cyclically turned in two dimensions. More specifically, the scanning mirror 12 is turned in the horizontal direction (X direction) at a high speed at the resonance frequency, and turned in the vertical direction (Y-direction) relatively at a low speed.

As described above, the comparative example is not arranged with the thin-wall portion 33p (see FIG. 4) which elastically deforms in accordance with variation in pressure of the sealed air K1. In other words, if the ambient temperature varies, the pressure inside of the "container" significantly varies because the volume of the "container" hardly changes. Incidentally, the sealed air K1 at constant volume will have the pressure at the ambient temperature of hundred degrees Celsius which is about 1.4 times larger than that at the ambient temperature of tens of degrees Celsius below zero. The air resistance to the scanning mirror 12 varies at the timing of the turning in accordance with the variation in pressure as described above, to cause the deflection angle in the horizontal direction of the scanning mirror 12 to be also varied. As a result, an image to be projected on the screen S is likely distorted or the size of the entire image is likely altered. Note that, with respect to the vertical direction in FIG. 10, there is little variation in the deflection angle because the scanning mirror 12 is turned at a relatively slow speed.

Figure 5:
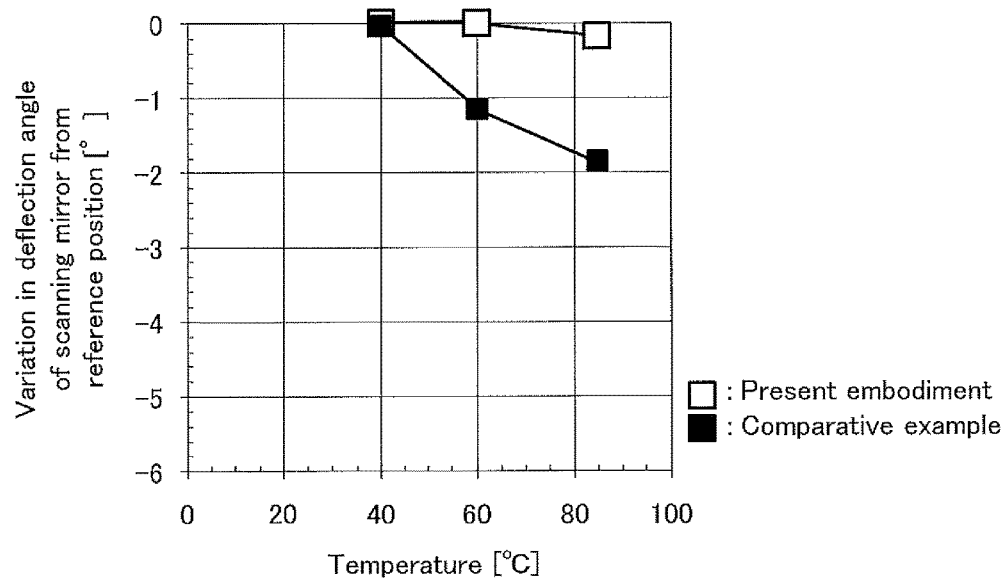
FIG. 5 is a chart showing the relationship between the temperature of the air sealed in the container and the variation in the deflection angle of the scanning mirror from the reference position.

FIG. 5 is a chart showing the relationship between the temperature of the sealed air K1 in the container and the variation in the deflection angle of the scanning mirror 12 from the reference position. The horizontal axis in FIG. 5 is the temperature of the sealed air K1 in the "container." The vertical axis in FIG. 5 is the variation in the deflection angle of the scanning mirror 12 from the reference position, in the case where the scanning mirror 12 is turned at a predetermined driving voltage.

A mark of □ in FIG. 5 shows data of the present embodiment, while a mark of ■ shows data of the comparative example having no thin-wall portion 33p (see FIG. 4). For either of the present embodiment and the comparative example, only deflection angles in the horizontal direction (X direction) are plotted.

In the comparative example, if the temperature of the sealed air K1 increases, for example, from 40° C. to 82.5° C., the deflection angle in the horizontal direction of the scanning mirror 12 being turned by a predetermined driving voltage is about 2 degrees smaller than the reference position. In contrast, in the present embodiment, even if the temperature of the sealed air K1 increases from 40° C. to 82.5° C., the deflection angle in the horizontal direction of the scanning mirror 12 being turned by the predetermined driving voltage has little variation from the reference position. This is because the thin-wall portion 33p (see FIG. 4) elastically deforms so as to reduce variation in pressure of the sealed air K1, to keep the pressure in the "container" substantially constant. Thus, the present embodiment allows a high-quality image having no distortion to be projected on the screen S, regardless of variation in the environmental conditions at a place where the device is installed.

Further, in the prior art in which an atmospheric pressure sensor (not shown) is arranged within the "container" and driving voltage for the scanning mirror 12 is set in accordance with a value detected by the sensor, there is a problem that the manufacturing cost increases for arranging the pressure sensor. Additionally, there is another problem that, in the above-mentioned prior art, a time lag until the detected value of the atmospheric pressure is reflected to the driving voltage, and variation in pressure of the sealed air K1 cause, in combination, the behavior of the scanning mirror 12 to become unstable.

For these problems, according to the present embodiment, variation in pressure of the sealed air K1 is reduced to make the deflection angle of the scanning mirror 12 being turned by the predetermined driving voltage substantially constant. In addition, the manufacturing cost of the scanning image display device 100 may significantly be reduced than the prior art, because there is no need to arrange any atmospheric pressure sensor.

Second Embodiment

A second embodiment is different from the first embodiment on the points that an inner cover 37 having a thin-wall portion 37p (see FIG. 6) is added and that an outer cover 33A has no thin-wall portion, while others are the same as in the first embodiment. Therefore, a description will be given of those differences from the first embodiment, and duplicate parts will not be described.

Figure 6:
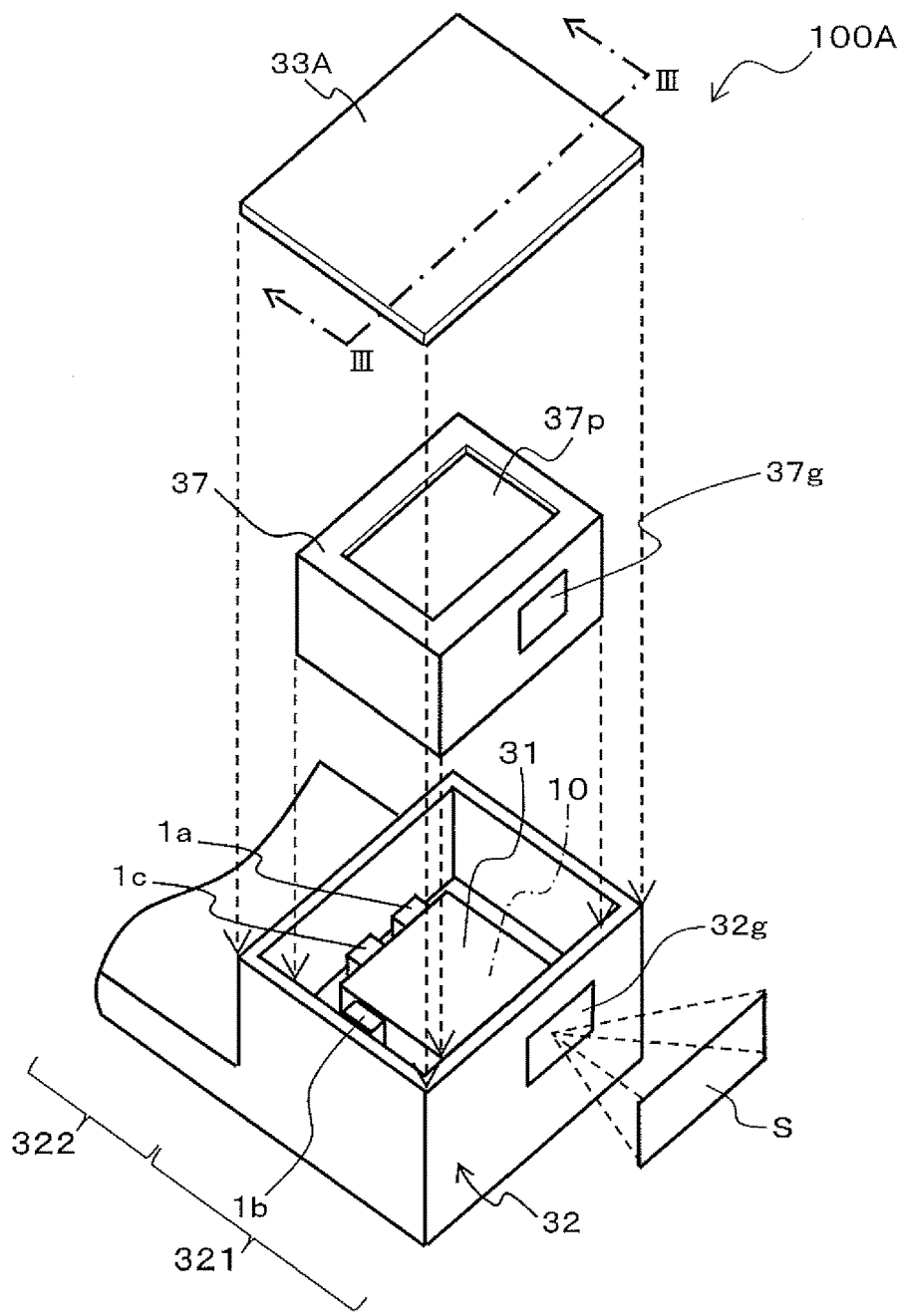
FIG. 6 is an exploded perspective view of the optical module, the housing, the base, the outer cover, and an inner cover, which are included in a scanning image display device according to a second embodiment of the present invention.

FIG. 6 is an exploded perspective view of the optical module 10, the housing 31, the base 32, the outer cover 33A, and the inner cover 37, which are included in a scanning image display device 100A according to the second embodiment.

The scanning image display device 100A of the second embodiment includes, in addition to the configuration described in the first embodiment, the inner cover 37 (first container) shown in FIG. 6.

The inner cover 37 accommodates the housing 31, and has a box-like shape having an open bottom. The inner cover 37 is fixed to the base 32, in a state that its lower end surface is in contact with the bottom wall of the base 32 (see FIG. 7). In addition, in the state that the inner cover 37 is fixed to the base 32, the inner cover 37 is internally sealed.

The inner cover 37 is formed of, for example, Al (aluminum), which has high thermal conductivity. Note that any material can be used for the inner cover 37 as long as it has high thermal conductivity, and Cu (copper) may be used, for example.

In addition, the inner cover 37 is arranged so as not to be in contact with the optical module 10 and the temperature adjusting element 36. That is, forming any heat conduction path is inhibited between the circuits mounted on the substrate (not shown) on the plate portion 322 in FIG. 6 and the laser light sources 1a, 1b, 1c, to inhibit the temperature of the laser light sources 1a, 1b, 1c from rising.

An inner cover glass 37g is glass for transmitting, toward the screen S, the laser light reflected by the scanning mirror 12 (see FIG. 1). The inner cover glass 37g is sealed so as to inhibit humid atmospheric air from entering into the cover 37.

Figure 7:
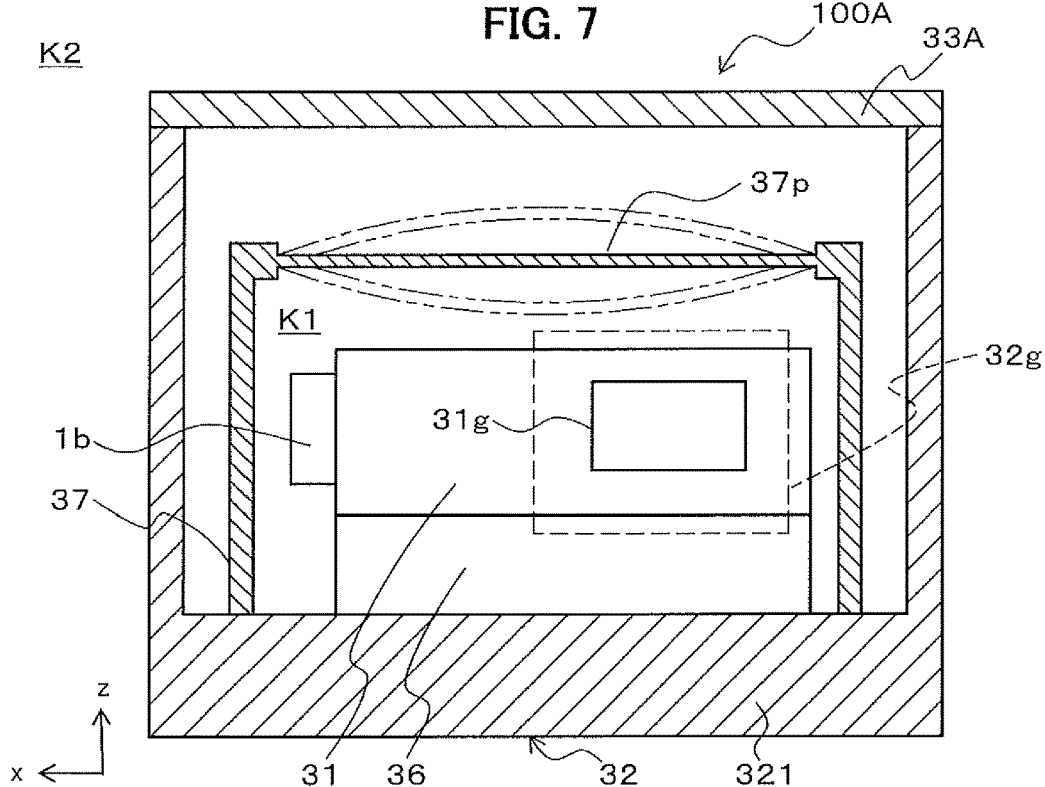
FIG. 7 is a cross-sectional view taken along an arrow line III-III in FIG. 6.

FIG. 7 is a cross-sectional view taken along an arrow line III-III in FIG. 6.

As shown in FIG. 7, the inner cover 37 includes the thin-wall portion 37p (first deformable portion) which is thinner than other portions of the inner cover 37. The thin-wall portion 37p elastically deforms in accordance with variation in pressure inside of the inner cover 37 (sealed air K1 in FIG. 7), to have a function of reducing the said variation in pressure.

Note that in the case of forming the inner cover 37 with Al (aluminum), a thickness of the thin-wall portion 37p preferably falls between 1 mm and 10 mm. This is because such a thickness allows the thin-wall portion 37p to elastically deform with ease in accordance with variation in pressure of the sealed air K1

The outer cover 33A is a plate-like member for accommodating the inner cover 37 along with the base 32, and is arranged so as to close the opening of the base 32. Note that a "second container" that accommodates the inner cover 37 is configured to include the base 32 and the outer cover 33A. In the present embodiment, the outer cover 33A has no thin-wall portion, as described above, and then the outer cover 33A hardly deforms.

Incidentally, the outer cover 33A may be sealed so as to inhibit the ambient air K2 from entering into a space between the outer cover 33A and the inner cover 37, or may allow the ambient air K2 to enter into the space between the outer cover 33A and the inner cover 37. This is because, regardless of whether the ambient air enters into the space between the outer cover 33A and the inner cover 37, dew condensation such as on the laser light sources 1a, 1b, 1c is reduced, as long as the inner cover 37 is internally sealed.

In addition, the limit of the inner cover 37 elastically deforming outward may be adjusted with a vertical distance between the upper surface of the thin-wall portion 37p (outer surface) and the lower surface of the outer cover 33A (inner surface). That is, the upper surface of the thin-wall portion 37p which elastically deforms may contact with the lower surface of the outer cover 33A at a certain height to limit the elastic deforming of the thin portion 37p. This prevents the inner cover 37 from being damaged.

<Advantageous Effects>

According to the present embodiment, the inner cover 37 including the thin-wall portion 37p is arranged to reduce variation in pressure within the inner cover 37. Accordingly, variation in the deflection angle of the scanning mirror 12 is reduced at a predetermined driving voltage, to reduce a distorted image to be projected on the screen S.

In addition, a space between the outer cover 33A and the inner cover 37 may also be sealed, for example, to seal the housing 31 in a dual structure for further reducing dew condensation in the optical module 10 than that in the first embodiment.

Further, the limit of the inner cover 37 elastically deforming outward is adjusted with the vertical distance between the thin-wall portion 37p and the outer cover 33A, to prevent the inner cover 37 from being damaged.

Third Embodiment

A third embodiment is different from the first embodiment on the points that an outer cover 33B (see FIG. 8) includes no thin-wall portion, and that the density of gas K3 (see FIG. 8) internally sealed in the "container" inclusive of the outer cover 33B is smaller than that of the ambient air K2, while others are the same as those in the first embodiment. Therefore, a description will be given of those differencies from the first embodiment, and duplicate parts will not be described.

Figure 8:
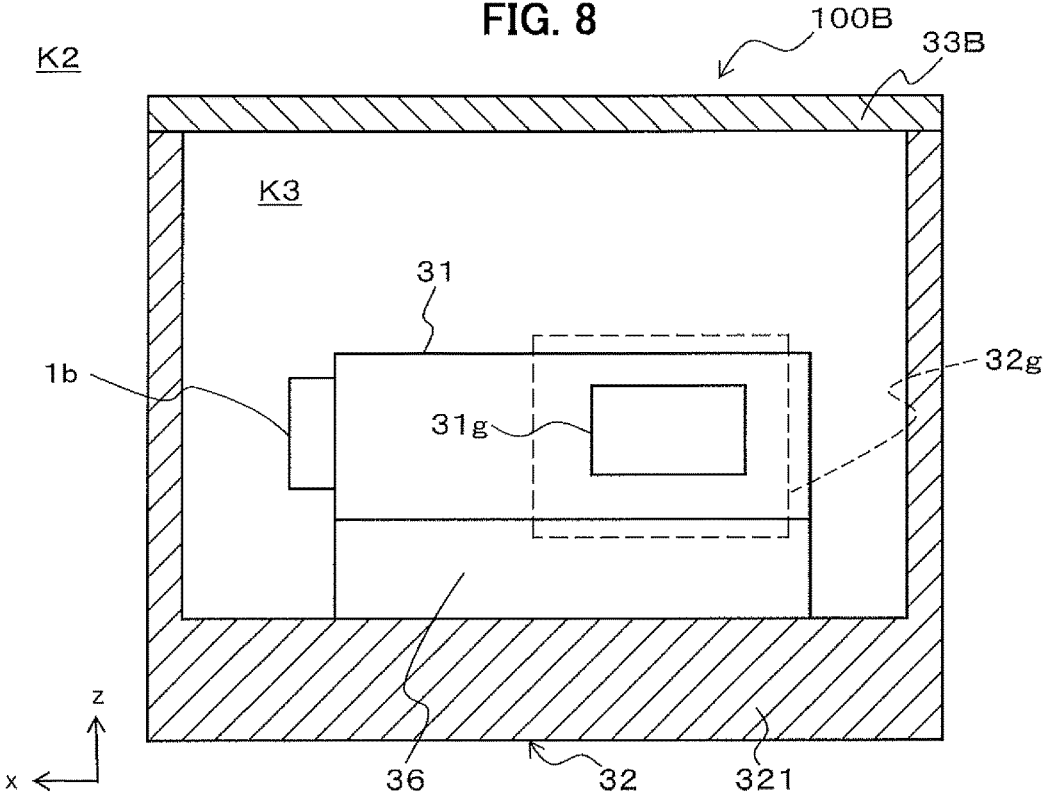
FIG. 8 is a longitudinal cross-sectional view of a scanning image display device according to a third embodiment of the present invention.

FIG. 8 is a longitudinal cross-sectional view of a scanning image display device 100B according to a third embodiment.

The base 32 and the outer cover 33B in FIG. 8 constitute a "container" that accommodates the housing 31, and is internally sealed. In the present embodiment, the density of the gas K3 which is sealed in the "container" is less than that of the air in the standard condition (0° C., 1013.25 hPa). Such gas K3 may employ, for example, helium or neon which has smaller molecular weight than nitrogen or oxygen.

Assuming that the said gas K3 is helium, the sealing is made in the following procedure. That is, the outer cover 33B is arranged to seal the base 32, and then the sealed air in the "container" is replaced with helium via the opening portion of the base 32 (where the sealing glass 32g is to be arranged). Then, the sealing glass 32g is arranged in the said opening to maintain the air tightness. Note that the gas K3 may be sealed at a higher temperature and a lower pressure than those in the standard state to make the gas K3 in the "container" to have relatively small number of moles. Sealing helium, which has the density less than that of the air, in the "container" in this manner allows the scanning mirror 12 to have less viscosity resistance at the time of being turned, as compared with a case of sealing the air. In addition, even if the temperature varies within the "container," the pressure hardly varies. Therefore, variation in the deflection angle of the scanning mirror 12 is reduced at the predetermined driving voltage, to reduce the distorted image to be projected on the screen S.

Alternatively, the viscosity of the gas K3 may be focused instead of the density of the gas K3 which is sealed in the "container." That is, the viscosity of the gas K3 which is sealed in the "container" may be less than that of the air in the standard state (0° C., 1013.25 hPa). Helium or neon may be used, for example, for the gas K3 as such.

<Advantageous Effects>

According to the present embodiment, sealing the gas K3 having the density or viscosity smaller than that of the air in the "container" allows for reducing variation in pressure within the "container." This leads to reducing variation in the deflection angle of the scanning mirror 12 to reduce the distortion of the image projected on the screen S.

In addition, according to the present embodiment, there is no need to arrange any thin-wall portion in the outer cover 33B, to simplify manufacturing the scanning image display device 100B.

MODIFICATIONS

Hereinabove, the scanning image display devices 100, 100A, 100B according to the present invention have been described for the respective embodiments, but the present invention is not limited to these and various modifications may be made. For example, a scanning image display device 100C may be constructed as described below.

Figure 9:
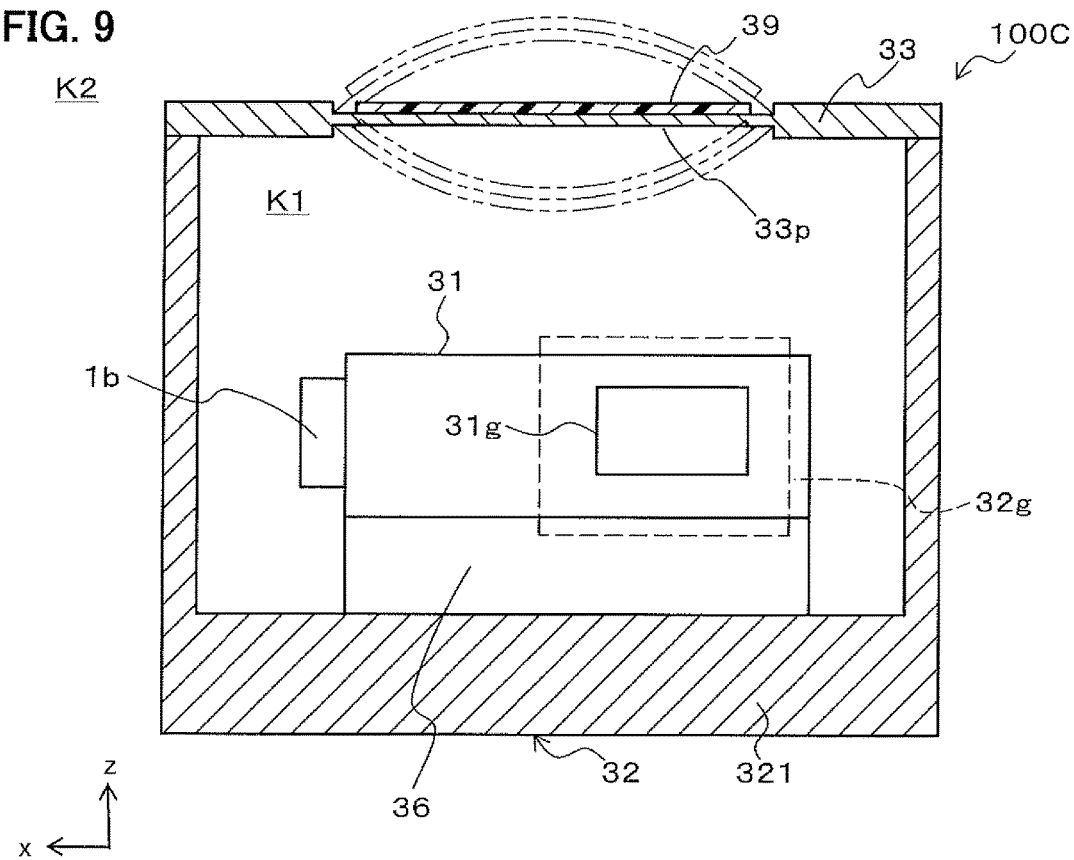
FIG. 9 is a longitudinal cross-sectional view of a scanning image display device according to a first modification of the present invention.

FIG. 9 is a longitudinal cross-sectional view of the scanning image display device 100C according to a first modification.

The first modification is configured to add a deformable portion 39 (second deformable portion) to the structure of the first embodiment. The deformable portion 39 is coated on or adhered to the outer surface of the thin-wall portion 33p (first deformable portion), and is formed of a material having a linear expansion coefficient larger than that of the thin-wall portion 33p. Polystyrene or polycarbonate may be used as a material for the deformable portion 39 as such.

On the condition that the temperature of the sealed air K1 in FIG. 9 increases to make the thin-wall portion 33p elastically deformed outward (see upper two-dot chain lines), the deformable portion 39 also expands in accordance with the said increasing temperature so as to be deformed outward as one with the thin-wall portion 33p.

In contrast, on the condition that the temperature of the sealed air K1 decreases to make the thin-wall portion 33p elastically deformed inward (see lower two-dot chain lines), the deformable portion 39 deflates in accordance with the said decreasing temperature so as to be deformed inward as one with the thin-wall portion 33p. Arranging the deformable portion 39 in this manner allows the thin-wall portion 33p to be easily deformed to suitably reduce variation in pressure within "container."

Note that the first modification may be applied to the second embodiment (see FIG. 7) to coat on or adhere to the outer surface of the thin-wall portion 37p (first deformable portion) a deformable portion (second deformable portion) having a linear expansion coefficient large than that of the inner cover 37.

As a second modification, pressure within the "container" may be reduced. That is, in the configuration of the first embodiment, the "container" (the base 32 and the outer cover 33; see FIG. 4) may be internally sealed to have a pressure lower than the "standard atmospheric pressure." Note that the said "standard atmospheric pressure" is the pressure of 1013.25 hPa (i.e., 1 atm).

For example, the pressure of the air sealed in the "container" may be reduced using a decompression chamber (not shown) so that the said pressure is lower than the standard atmospheric pressure. This makes the viscosity resistance of the air smaller when the scanning mirror 12 is turned, to allow for reducing variation in the deflection angle of the scanning mirror 12 as compared with that in the first embodiment. Note that the atmospheric pressure may have some variation depending on the environmental conditions at a place where the scanning image display device 100 is installed, but as the pressure within the "container" is sufficiently reduced, the said pressure is maintained at a pressure lower than the standard atmospheric pressure even at the time of using the scanning image display device 100.

In addition, the "container" may internally be made substantially in vacuum (close to the vacuum state). That is, in the configuration of the first embodiment, after the outer cover 33 is set on the base 32 (see FIG. 4), a vacuum pump (not shown) may be used to internally make the "container" substantially in vacuum before sealing it with the sealing glass 32g. Alternatively, a vacuum valve (not shown) may be arranged on the base 32 and used to internally make the "container" substantially in vacuum. Once the "container" is internally made substantially in vacuum, internal density and viscosity are maintained substantially at zero even if the internal temperature varies by the heat radiation from the walls of the "container." This allows for reducing variation in the deflection angle of the scanning mirror 12, regardless of variation in the temperature. Note that the second modification is also applicable to the second and third embodiments.

As a third modification, the temperature adjusting device 36 (see FIG. 4) may be used in the first embodiment to make the temperature within the "container" relatively high before the outer cover 33 is set on the base 32. A higher temperature under a predetermined pressure makes the density and viscosity of the sealed air K1 smaller to reduce variation in pressure within the "container." Alternatively, a thermostat (not shown) may be arranged in place of the temperature adjusting device 36 to make the temperature within the "container" relatively high before sealing the sealed air K1 in the "container." Note that the third modification is also applicable to the second and third embodiments.

As a fourth modification, a diaphragm (first deformable portion) may be used in place of the outer cover 33 in the first embodiment. Alternatively, an opening may be formed at a portion of the outer cover 33 to set a diaphragm over the opening. Resin diaphragm is deformed more easily than the metal outer cover, to allow for suitably reducing variation in pressure within the "container." Note that the fourth modification is also applicable to the second embodiment.

As a fifth modification, an adsorbent (not shown) may be arranged within the "container" in the first embodiment (e.g., between the housing 31 and the outer cover 33; see FIG. 4). This allows moisture within the "container" to be adsorbed by the adsorbent. As a result, the pressure within the "container" is reduced as compared with that at the time of the air being sealed in the "container" so as to reduce variation in pressure within the "container." In addition, arranging the adsorbent will prevent dew condensation in the optical module 10. Note that the fifth modification is also applicable to the second and third embodiments.

As a sixth modification, a top wall of the inner cover 37 in the second embodiment (see FIG. 7) may be formed with a diaphragm, and the diaphragm may be deformed outward (upward) to reduce pressure within the inner cover 37 when the outer cover 33A is set on the base 32. For example, magnets may be arranged on the lower surface of the outer cover 33A and the upper surface of the diaphragm, respectively, such that these magnets attract to each other in a vertical direction. When the outer cover 33A is set, part of the diaphragm is lifted by a magnetic force to cause the diaphragm to be deformed so as to expand outward. This reduces pressure within the inner cover 37 to allow for reducing variation in the deflection angle of the scanning mirror 12.

In addition, the embodiments may be combined as appropriate. For example, the first embodiment may be combined with the third embodiment, and helium or neon may be sealed in the "container" in the first embodiment. That is, the density of the gas sealed in the "container" may be made less than that of the air in the standard condition. Alternatively, the viscosity of the gas sealed in the "container" may be made less than that of air in the standard condition. This makes the viscosity resistance smaller when the scanning mirror 12 is turned, to allow for further reducing variation in the deflection angle of the scanning mirror 12 as compared with that in the first embodiment. Similarly, the second embodiment may be combined with third embodiment.

Further, in the embodiments, the configuration inclusive of the biaxially-driven scanning mirror 12 (see FIG. 1) has been described, but is not limited thereto. That is, two uniaxially-driven scanning mirrors may be employed for arrangement to scan laser light in directions orthogonal to each other.

Furthermore, in the embodiments, the configuration has been described in which the temperature adjusting device 36 is arranged for reducing the temperature rise of the laser light sources 1*a*, 1*b*, 1*c*, but is not limited thereto. That is, if the environmental conditions at a place, where the scanning image display device 100 is installed, are understood in advance to predict that the temperature within the "container" falls within the guaranteed operating temperature range of the laser light sources 1*a*, 1*b*, 1*c*, even without the temperature adjusting device 36, the temperature adjusting element 36 may be eliminated.

Moreover, the embodiments have been described in detail in order to better illustrate the present invention, but are not necessarily limited to those having all the components as described. Also, some components of the embodiments may be deleted, or added with or replaced by other components.

Still moreover, the above-described mechanisms and configurations are those considered to be necessary for the description, but are not necessarily all the mechanisms and configurations of a product.

What is claimed is:

1. A scanning image display device comprising:
    a laser light source that emits laser light based on image information;
    a scanning mirror that scans the laser light emitted from the laser light source to project an image on a projection plane;
    a housing that holds the laser light source and the scanning mirror; and
    a container that accommodates the housing and is internally sealed,
    wherein the container has a first deformable portion that is elastically deformed with a variation in pressure within the container, and
    wherein the first deformable portion has a wall whose thickness is thinner than the rest of the container.

2. The scanning image display device according to claim 1, further comprising:
    a second deformable portion that is coated on or adhered to the outer surface of the first deformable portion, and has a linear expansion coefficient larger than that of the first deformable portion.

3. The scanning image display device according to claim 1, wherein
    the container is internally sealed to have a pressure lower than the standard atmospheric pressure.

4. The scanning image display device according to claim 1, wherein
    the density of gas sealed in the container is less than that of air in the standard condition, or
    the viscosity of the gas sealed in the container is less than that of the air in the standard condition.

5. The scanning image display device according to claim 2, wherein
    the density of gas sealed in the container is less than that of air in the standard condition, or
    the viscosity of the gas sealed in the container is less than that of the air in the standard condition.

6. The scanning image display device according to claim 3, wherein
    the density of gas sealed in the container is less than that of air in the standard condition, or
    the viscosity of the gas sealed in the container is less than that of the air in the standard condition.

7. A scanning image display device comprising:
    a laser light source that emits laser light based on image information;
    a scanning mirror that scans the laser light emitted from the laser light source to project an image on a projection plane;
    a housing that holds the laser light source and the scanning mirror;
    a first container that accommodates the housing and is internally sealed; and
    a second container that accommodates the first container,
    wherein the first container has a first deformable portion that is elastically deformed with a variation in pressure within the first container, and
    the first deformable portion has a wall whose thickness is thinner than the rest of the first container.

8. The scanning image display device according to claim 7, further comprising:
    a second deformable portion that is coated on or adhered to the outer surface of the first deformable portion, and has a linear expansion coefficient larger than that of the first deformable portion.

9. The scanning image display device according to claim 7, wherein
    the first container is internally sealed to have a pressure lower than the standard atmospheric pressure.

10. The scanning image display device according to claim 7, wherein
    the density of gas sealed in the first container is less than that of the air in the standard condition, or
    the viscosity of the gas sealed in the first container is less than that of the air in the standard condition.

11. The scanning image display device according to claim 8, wherein
    the density of gas sealed in the first container is less than that of the air in the standard condition, or
    the viscosity of the gas sealed in the first container is less than that of the air in the standard condition.

12. The scanning image display device according to claim 9, wherein
    the density of gas sealed in the first container is less than that of the air in the standard condition, or
    the viscosity of the gas sealed in the first container is less than that of the air in the standard condition.

13. A scanning image display device comprising:
    a laser light source that emits laser light based on image information;
    a scanning mirror that scans the laser light emitted from the laser light source to project an image on a projection plane;
    a housing that holds the laser light source and the scanning mirror; and
    a container that accommodates the housing and is internally sealed,
    wherein the container has a first deformable portion that is elastically deformed with a variation in pressure within the container, and
    wherein the container is internally sealed to have a pressure lower than the standard atmospheric pressure.

14. The scanning image display device according to claim 13, further comprising:
    a second deformable portion that is coated on or adhered to the outer surface of the first deformable portion, and has a linear expansion coefficient larger than that of the first deformable portion.

15. The scanning image display device according to claim 13, wherein
    the density of gas sealed in the container is less than that of air in the standard condition, or the viscosity of the gas sealed in the container is less than that of the air in the standard condition.

16. The scanning image display device according to claim 14, wherein
the density of gas sealed in the container is less than that of air in the standard condition, or
the viscosity of the gas sealed in the container is less than that of the air in the standard condition.

* * * * *